Oct. 20, 1953  F. M. DARNER ET AL  2,656,447
INDICATING DEVICE FOR SEAM WELDING APPARATUS
Filed Sept. 20, 1949  2 Sheets-Sheet 1

INVENTORS
Frederic M. Darner
BY and Walter S. Schaefer

Robert S. Dunham

ATTORNEY

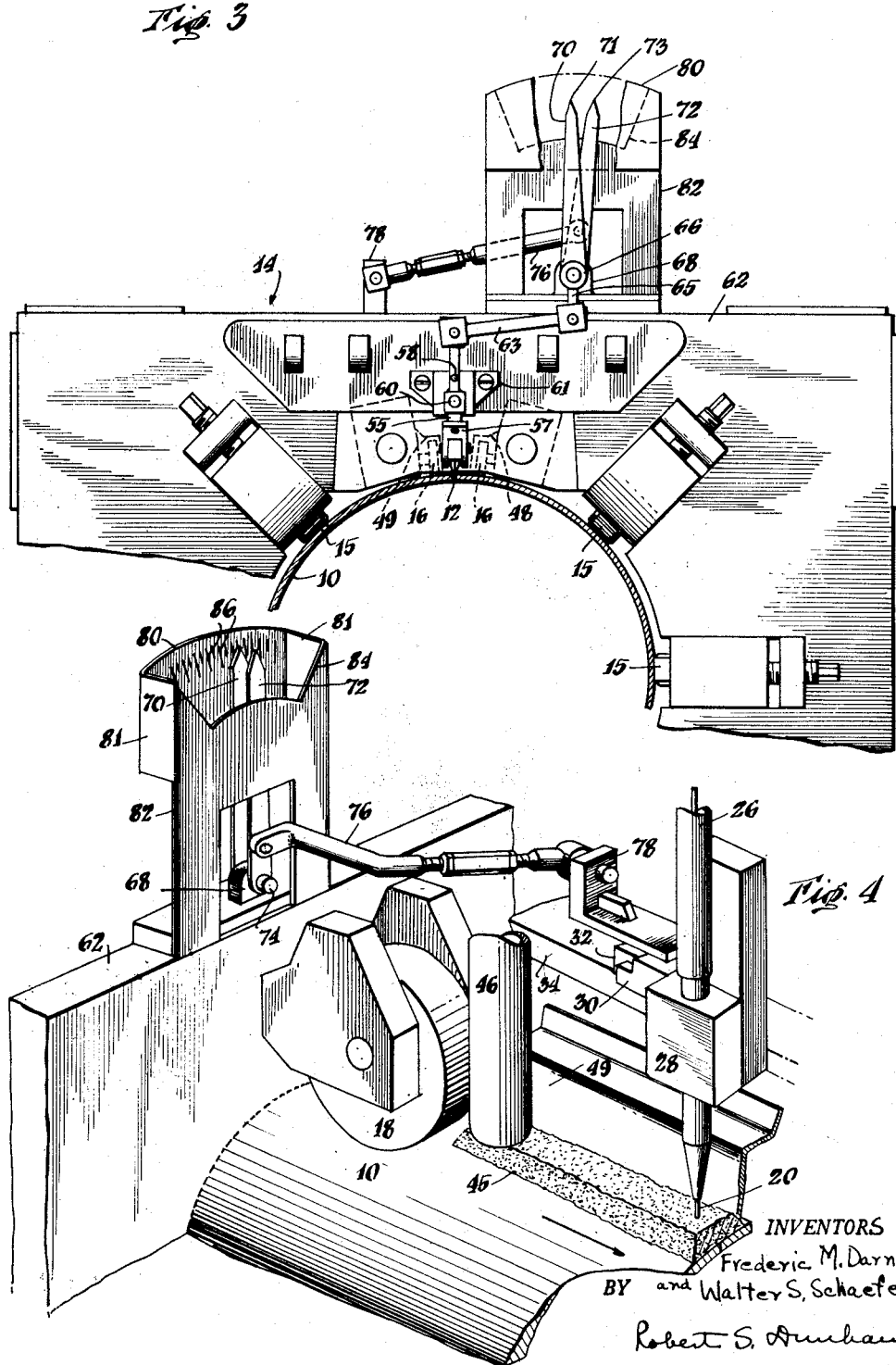

Patented Oct. 20, 1953

2,656,447

UNITED STATES PATENT OFFICE 2,656,447

INDICATING DEVICE FOR SEAM WELDING APPARATUS

Frederic M. Darner, Shaker Heights, Ohio, and Walter S. Schaefer, East Gadsden, Ala., assignors to Republic Steel Corporation, Cleveland, Ohio, a corporation of New Jersey Application September 20, 1949, Serial No. 116,762

7 Claims. (Cl. 219—6)

This invention relates to indicating and regulating instrumentalities for seam welding apparatus, more particularly in apparatus for manufacturing pipe or like articles. In an important specific aspect, the invention is peculiarly adapted for pipe making equipment wherein large diameter pipe (say, 20 inches to 30 inches in diameter) is produced by welding a seam along a longitudinal cleft in a tubular pipe blank which is continuously advanced past the welding means in an axial direction. Such apparatus involves a considerable assembly of cooperating devices for guiding, aligning and steadying the pipe blank during its passage to and through the welding station, the guiding and holding equipment preferably constituting a chuck device having a multiplicity of rollers or the like for compressively engaging the pipe blank and holding it and particularly the edges of its cleft against any unwanted displacement while the seam is being welded.

A presently preferred type of welding operation involves one or more arc electrodes disposed adjacent the path of the cleft so that a welding arc is maintained between the electrodes and the edges of the cleft to produce the desired welded seam. In performing such operation a continuous layer of flux, e. g. loose, finely granular material, is deposited on the pipe blank, in bridging relation to the cleft, as the latter approaches the welding electrodes, so that the electrodes operate beneath the surface of the thick layer or heap of flux, which in turn remains over the seam until the welded portion of the pipe is advanced to a remote locality beyond the chuck.

By reason of the nature of the chuck device and the rollers and other instrumentalities surrounding the pipe blank therein, and also by reason of the employment of a rather wide band of flux covering the cleft and the welded seam during practically the entire travel of the pipe blank through the chuck, it is usually impossible, or for any of these reasons at least difficult or inconvenient, for the attending operator to observe the line of the cleft or the produced seam as the latter is passing the welding electrodes. While the apparatus may also include means back of the chuck, for guiding and aligning the cleft to present it with some accuracy along a path leading to the electrodes, experience has shown that some displacement or wandering of the cleft line is apt to occur, for example due to slight rotative distortion of the pipe blank from one place to another along it (such blanks being of the order of 30 feet in length) or by other circumferential displacement of the tubular article about its axis.

Although such positional variations may be relatively small, perhaps no more than a minor fraction of an inch, it is important that the welding electrode or electrodes be strictly aligned with the cleft line for completeness and security of the welded seam, i. e. to position it exactly and symmetrically along the cleft. Means are therefore provided to effect mutual adjustment between the cleft line of the pipe and the welding electrodes, for example, by transverse adjustment of the latter, but the difficulties of observation mentioned above, have rendered it correspondingly difficult for the operator to make the described, accurate adjustments as are necessary from time to time.

Accordingly a chief object of the present invention is to afford novel instrumentalities for indicating the lateral or circumferential position of the cleft in a pipe blank or the like as it approaches the welding apparatus, to permit regulation of the latter in exact registry with the cleft. Further objects are to afford improved and accurate seam-following means, e. g. for following the line on the pipe blank or the like upon which seam-producing operation is to be performed, such means affording continuous and promptly exhibited indication of the positional relationship between such line and the working instrumentalities.

Still further objects are to afford new and improved indicating means of the character described, which are of a rugged nature and appropriate for heavy equipment such as used in manufacturing large diameter pipe and yet which show continuously the relative positions of the seam line and the welding equipment, also preferably revealing the relation of such positions to a fixed point or locality of the apparatus. Another object is to afford novel and more effective seam following and indicating instrumentalities, showing in an amplified or magnified manner, minute positional variations of the character stated, e. g. between the line of work and the seam-making device.

Other objects are to provide new and effective arrangements for indicating the position of a cleft or work line, relative to welding means, in apparatus for welding a seam or joint along a predetermined line in an article which is advanced in the direction of such line, it being understood that the devices hereinbelow described are applicable, in a broader sense, to various types of apparatus, as for operation upon other articles than pipe of the character stated.

To these and other ends, a presently preferred embodiment of the invention is hereinbelow described and set forth in the accompanying drawings, by way of example to illustrate the features and principles of improvement.

Referring to the drawings:

Fig. 3 is an end elevation of the device and of a portion of the associated chuck structure, taken from the left hand or pipe-entering end of Fig. 1 and showing the pipe blank in cross section; and Fig. 4 is a schematic, simplified perspective view taken diagonally from the same side as Fig. 1 and showing the device in operation as pipe is being welded.

Figure 1:
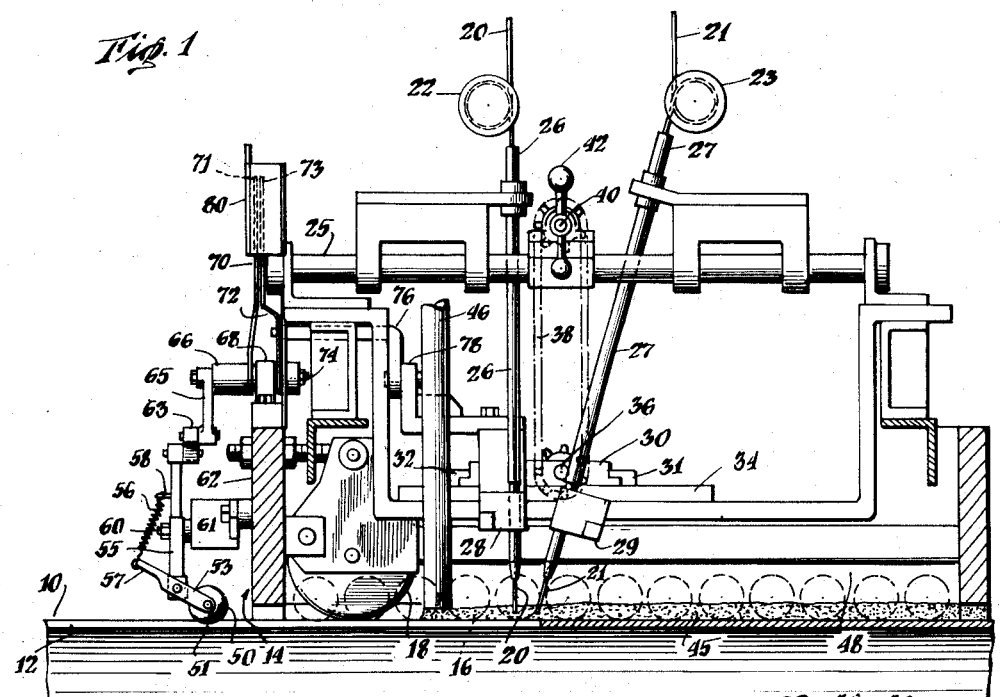
Fig. 1 is a side elevation of the device as associated with the chuck of pipe manufacturing apparatus of the character stated.
Figure 2:
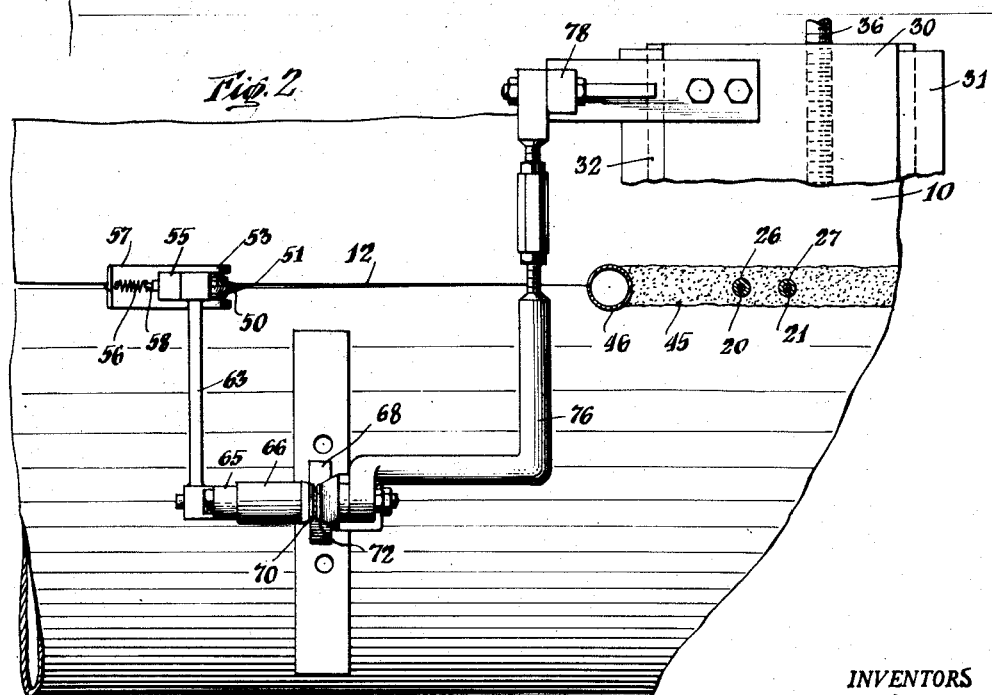
Fig. 2 is an enlarged plan view of the device, omitting most of the supporting structure.

As indicated hereinabove, the illustrated embodiment of the invention is shown in combination with apparatus through which a pipe blank 10 having a longitudinal cleft 12 is continuously advanced in the direction of its axis (as by means not shown), such apparatus comprising a chuck device generally designated 14. While the particular construction of the chuck 14 forms no part of the present invention and while many details of its structure are therefore omitted from the drawings, it will be understood that it includes a multiplicity of sets of rollers 15, the sets being distributed circumferentially about the passing pipe and each set including a multiplicity of such rollers arranged in a linear array, i. e. lengthwise of the pipe blank, so that the latter is held, in compressive rolling engagement, at a great many points as it progresses through the chuck.

The cleft line 12 being conveniently disposed uppermost in the apparatus, further sets of rollers 16 are arranged in longitudinal array along the cleft path and close to it at each side, so as to keep the cleft edges as steady as possible against mutual displacement during and after the welding operation. A larger register roller 18 may also be provided to bear against the cleft, in bridging relation to it, as the pipe blank advances into the chuck.

The welding apparatus may include one or more welding electrodes, for example represented by the series of two wire electrodes 20, 21, having their lower ends disposed in close proximity to the cleft line to be welded and arranged in a linear array along such path as shown. The electrodes 20, 21 consist of suitable welding wire or rod continuously fed (as the same is consumed in the arc welding operation) by devices 22, 23 of conventional structure, from reels of such wire, not shown. The feeding devices 22, 23 are carried by appropriate supporting means 25 mounted well above the chuck 14, and the wires 20, 21 are respectively advanced through sleeves 26, 27 and guide nozzle structures 28, 29, toward the weld locality.

The nozzle structures 28, 29 are mounted on a slide 30 horizontally movable in transverse ways 31, 32, that are in turn carried by a supporting plate 34 just above and at one side of the weld locality. Suitable means are provided for moving the slide 30 in a direction crosswise of the path of the pipe blank, such means being represented, for example, by a lead screw 36 coupled by a sprocket chain 38 to an upper shaft 40 on the supporting structure 25, such upper shaft being turned by a hand wheel or crank 42. Thus the operator may make fine adjustments of the position of both electrodes 20, 21 (simultaneously) relative to the path of the cleft 12, i. e. crosswise of such path, by turning the handle 42.

A layer of suitable flux 45, say one or two inches deep, is continuously deposited on the pipe blank from a supply conduit 46 disposed just above the cleft line at a region to the rear of the arc electrode means, in the path of pipe travel. The resulting layer of solid, finely divided flux particles is retained, e. g. in a path of desired width, by longitudinal shield plates 48, 49. In consequence the electrodes plow continuously, so as to speak, through the layer of flux, and the arcs struck between the electrodes and the work, as well as the seam line itself, are buried beneath the mass of flux. It will now be appreciated that by reason of the various structures, supports, rollers, shields and other devices, in the vicinity of the welding means, and likewise because of the layer of flux 45, the operator cannot observe the cleft line within the chuck, nor from his position adjacent the latter can he very well see such line at any other near point of the advancing pipe blank.

In accordance, therefore, with the present invention, a seam follower device is provided, including a seam following wheel 50 having a sharp circular edge 51 which slightly but sufficiently penetrates the crack, along the top of the pipe blank, constituted by the meeting edges of the cleft 12. The wheel 50 is thus designed for positive, continuous engagement with the cleft as the latter, in essentially closed position, approaches the chuck. To roll along the cleft crack in this manner, the wheel is mounted to turn on a horizontal axis at the end of an arm 53 which extends in an upwardly slanting direction and is pivoted, about a parallel axis, at the lower end of a further, lever arm 55, the arm 53 thereby rocking, as necessary, to accommodate irregularities, variations of level, and the like, encountered by the wheel. A coil spring 56 under tension between the opposite end 57 of the arm 53 and an upper point 58 of the vertical arm 55, urges the wheel 50 downward and keeps it firmly engaged in the cleft crack.

The vertical arm 55 is pivoted at a point 60, intermediate its ends, to swing about an axis parallel to that of the pipe, i. e. to rock crosswise of the latter, on a supporting bracket 61 carried by the heavy end plate 62 of the chuck assembly. The upper and opposite end of the arm 55 is connected by a transverse link 63 to a short crank arm 65 carried on a stub shaft 66 which is journaled or pivotally mounted on an upright support 68 secured at the top of the plate 62. The shaft 66 also carries a long upwardly projecting hand or pointer 70, which is thus adapted to swing (crosswise, above the pipe) as the shaft 66 is turned. In consequence of the described arrangement of levers and linkage, any transverse motion of the follower wheel 50 is transmitted and amplified into corresponding, larger, transverse motion of the upper pointed end 71 of the hand 70.

A similar hand or pointer 72 having a like upper pointed end 73 is pivotally mounted, but separately from the hand 70, on the opposite or forward side of the support 68, i. e. so that the hand 72 may swing about the same horizontal axis 74 (parallel to the pipe) as the hand 70, but independently of the latter. At a locality shortly above its pivot axis 74 the hand 72 is connected by a long, crankshaped link 76 to an upright bracket 78 carried with the welding electrodes, the bracket being mounted, for example, on the slide 30 which supports the nozzle guides 28, 29. It will thus be seen that by virtue of the link connection 76 pivoted at its ends to the bracket 78 and the hand 72, minute transverse displacements of the slide 30 and thus of the welding electrodes, are transmitted to the hand 72 and are thus represented by correspondingly larger, i. e. amplified displacements of the pointed end 73 of the latter.

While the closely superimposed but separately movable hands 70, 72 thus afford continuous indication of the relative positions of the seam cleft 12 and the welding means 20, 21, and are eminently effective in providing accurate regulation of the welding means so as to follow the desired seam path, the preferred structure shown also includes a stationary target or scale 80 disposed behind the hands 70, 72 as seen from the position of the operator adjacent the chuck. More particularly, the target 80 may consist of a vertical plate as shown, carried by ears 81 from a vertical shield plate 82 which is mounted upright on the end structure 62 of the chuck device. The shield plate 82 is cut away at its upper part 84 so as to reveal the ends of the hands 70, 72 disposed in front of the plate 80. The latter may carry graduations 86 representing, so to speak, a series of fixed points of the apparatus crosswise of the pipe path, i. e. to permit a reading of the absolute positions of the seam cleft and the welding means relative to the stationary structure.

It will now be seen that the described instrumentalities afford a convenient and yet highly accurate means for continuously indicating the positions of the seam cleft and the welding device with respect to each other and also in an absolute sense. While the follower wheel 50 is displaced a short distance, along the cleft, from the welding means, experience has shown that it is close enough to represent the position of the cleft under the electrodes, in that no appreciable lateral displacement of the cleft is possible in its short travel from the wheel 50 to the electrodes 20, 21. Indeed the brief time lag involved, i. e. in the passage of a given point on the pipe from the wheel to the electrodes, may be deemed advantageous to the extent that it permits the operator, in adjusting the electrodes, to follow more readily or more promptly any incipient deviation indicated (at the wheel locality) by the hand 70.

As explained, the hand 70 represents the cleft position and the hand 72 the location of the welding means, while the target or scale 80 is a stationary reference for the ends 71, 73 of the two hands. The several linkage connections being designed and adjusted, for example, to have an exactly parallel motion or extent of motion so that the hands are exactly superimposed whenever the electrode wires 20, 21 are immediately over the cleft (i. e. at any position of the latter), it only remains for the operator to watch the hands and adjust the welding means (as by the crank 42) to whatever extent may be necessary, from time to time, to keep the hands in the described relation. Since the motion of the indicating devices is greatly ampliefid as seen in the space 84 above the shield, a displacement as small as ⅛ inch or indeed less may be readily detected as a considerable larger disparity between the hand positions, and correction effected accordingly. As will be apparent, the natures of the different linkages to the respective hands 70, 72 are such that despite the different distances and locations of their controlling instrumentalities from the indicator, equal displacements of such instrumentalities provide equal angular response of the hands. Furthermore, the movements of the hands are in the same absolute direction as the controlling movements of the wheel 50 and the arc electrodes, so that the readings are perfectly natural and require no mental transposition by the operator as he adjusts the apparatus. The shielding effect of the plate 82 helps to avoid confusion in observation; the operator's attention is focussed on the ends 71, 73 of the hands, where the displacements are most amplified.

In reference to the stationary target 80, the general operation of the apparatus, in the matter of the positioning of the cleft, may also be read from these instrumentalities. A continuing divergence of the hand 70 from a desired, say central position, may indicate a need for other adjustment (as of the pipe guiding and aligning means, not shown) to keep the pipe cleft within a range that can be reached by the described, fine adjustments of the welding device. The target 80, affording a plain background, is also of observational advantage in the normal course of electrode adjustment. Likewise, for example, if any divergence between the ends of the hands is permissible as a matter of specified tolerance, the target makes it easier for the operator to judge or read a departure of the hands from the tolerated deviation.

The described apparatus, moreover, is of a rugged and heavy construction, not easily susceptible of damage or of impairment in its fidelity of indication, and may be of suitably large dimensions to permit easy and clear observation at all times; yet it very accurately and reliably serves the desired purpose of providing exact registration between the welding means and the desired line of seam.

It is to be understood that the invention is not limited to the specific apparatus herein shown and described, but may be embodied in other forms without departure from its spirit.

What is claimed is:

1. In apparatus for manufacturing pipe from a tubular blank having a longitudinal cleft wherein the blank is advanced axially, in combination, a supporting structure to engage said axially advancing blank, welding means disposed on the exit side of said supporting structure to weld a seam along the cleft as the blank passes, said welding means being adjustable relative to said supporting structure and transversely of the pipe blank, a member engaging the cleft of the passing blank on the entry side of said supporting structure and shiftable in accordance with transverse displacements of said cleft relative to said supporting structure, and means positionally controlled by the welding means and the cleft engaging member and adapted to provide amplified indication of the relative crosswise position of said welding means and cleft engaging member to each other and to said supporting structure, for indicating departure of the cleft from a predetermined positional relation to the welding means and to said supporting structure, said indicating means comprising a pair of juxtaposed indicating members respectively movable by, and in accordance with transverse displacements of, the welding means and the cleft engaging means, and a third indicating member connected with the supporting structure and disposed adjacent, and in a position observable with the aforesaid pair of members, for indicating the transverse displacements of both the cleft and the welding means relative to the supporting structure.

2. In apparatus for welding a seam along a cleft in an article which is advanced in the direction of the cleft, said apparatus including a supporting structure to engage the advancing article, a welding device and provision for mutual adjustment between said device relative to said supporting structure and the article crosswise of the cleft, in combination, shiftable means adapted for continuous engagement with the cleft for sensing crosswise displacements of the cleft relative to said supporting structure, a movable indicating device having a linkage extending to said first-mentioned means for displacing the said indicating device in accordance with crosswise displacements of the cleft, a second indicating device adapted to be positionally controlled by the welding device and disposed closely adjacent the first indicating device, said indicating devices being disposed at a predetermined locality and being mutually movable under control of said first-mentioned means and welding device as aforesaid, for continuously exhibiting, by the relative positions of said indicating devices at said locality, the relative crosswise positions of the cleft and welding device to each other and to said supporting structure, the welding device being movable crosswise of the article, and means for adjusting the welding device in such crosswise direction, the indicating devices comprising a corresponding pair of hands separately pivoted on a common axis, the second of said hands having attached linkage adapted to be displaced by the welding device, for controlling said second hand.

3. The apparatus described in claim 2 which includes a target plate carried by said supporting structure and disposed adjacent said hands in parallel relation to their paths of movement about the aforesaid axis, for indicating the positions of the cleft and welding device relative to said structure.

4. In apparatus for manufacturing pipe from a tubular blank having a longitudinal cleft, wherein the blank is advanced axially, in combination, a supporting structure through which said blank is advanced, welding means disposed on the exit side of said supporting structure to weld a seam along the cleft as the blank passes, said welding means being adjustable relative to said supporting structure and transversely of the pipe blank, a cleft engaging device disposed on the entry side of said supporting structure and displaceable transversely with the cleft relative to said supporting structure, means including a member having an indicating portion and linkage connecting said member with the cleft engaging device for effecting amplified displacements of said indicating portion corresponding to the cleft displacements, a second member having an indicating portion and positionally controlled by the welding means in accordance with displacements of the welding means transversely of the supporting structure, said members being associated with their indicating portions in juxtaposed relation and being mutually movable under control of the cleft engaging device and the welding device as aforesaid, to indicate the relative positioning of the cleft and the welding means to each other and to said supporting structure, a second linkage connecting said second member with the welding means, for effecting amplified displacements of the indicating portion corresponding to transverse displacements of the welding means and amplified in equal degree to the displacements of the indicating portion of the first member, and a target plate carried by said supporting structure and disposed at one side of both members to be swept by their indicating portions, for indicating the positions of both the cleft and the welding means relative to said structure.

5. In apparatus for manufacturing pipe from a tubular blank having a longitudinal cleft, wherein the blank is advanced axially, in combination, a supporting structure through which said blank is advanced, welding means disposed on the exit side of said supporting structure to weld a seam along the cleft as the blank passes, said welding means being adjustable relative to said supporting structure and transversely of the pipe blank, a cleft engaging device disposed on the entry side of said supporting structure and displaceable transversely with the cleft relative to said supporting structure, means including a member having an indicating portion and linkage connecting said member with the cleft engaging device for effecting amplified displacements of said indicating portion corresponding to the cleft displacements, a second member having an indicating portion and positionally controlled by the welding means in accordance with displacements of the welding means transversely of the supporting structure, said members being associated with their indicating portions in juxtaposed relation and being mutually movable under control of the cleft engaging device and the welding device as aforesaid, to indicate the relative positioning of the cleft and the welding means to each other and to said supporting structure, and a second linkage connecting said second member with the welding means, for effecting amplified displacements of the indicating portion corresponding to transverse displacements of the welding means, and amplified in equal degree to the displacements of the indicating portion of the first member.

6. The apparatus of claim 5 wherein the first and second members comprise a corresponding pair of elongated hands separately pivoted on a common axis, the remote end of each hand constituting the corresponding aforesaid indicating portion, and wherein said linkages are respectively pivotally connected to said hands at points equally spaced from said axis, to provide the aforesaid equality of amplification of the indicating portions.

7. In apparatus for manufacturing pipe from a tubular blank having a longitudinal cleft, wherein the blank is advanced axially, in combination, a supporting structure through which said blank is advanced, welding means disposed on the exit side of said supporting structure to weld a seam along the cleft as the blank passes, said welding means being adjustable relative to said supporting structure and transversely of the pipe blank, a cleft engaging device disposed on the entry side of said supporting structure and displaceable transversely with the cleft relative to said supporting structure, means including a member having an indicating portion and linkage connecting said member with the cleft engaging device for effecting amplified displacements of said indicating portion corresponding to the cleft displacements, a second member having an indicating portion and positionally controlled by the welding means in accordance with displacements of the welding means transversely of the supporting structure, said members being associated with their indicating portions in juxtaposed relation and being mutually movable under control of the cleft engaging device and the welding device as aforesaid, to indicate the relative positioning of the cleft and the welding means to each other and to said supporting structure, the cleft engaging device comprising a roller having an edge to engage the cleft, arm means pivotally mounting the roller and connected to said linkage, said arm means being adapted to swing in a plane longitudinal of the pipe blank and comprising means resiliently urging the roller in continuous rolling engagement with the cleft.

FREDERIC M. DARNER.
WALTER S. SCHAEFER.

References Cited in the file of this patent

UNITED STATES PATENTS

| Number | Name | Date |
|---|---|---|
| 1,983,930 | Carlsen | Dec. 11, 1934 |
| 2,061,671 | Riemenschneider | Nov. 24, 1936 |
| 2,068,166 | Dodge | Jan. 19, 1937 |
| 2,085,808 | Krause | July 6, 1937 |
| 2,189,399 | Lewkers | Feb. 6, 1940 |
| 2,364,645 | Mott et al. | Dec. 12, 1944 |